(12) United States Patent
Strohmeier et al.

(10) Patent No.: US 8,197,611 B2
(45) Date of Patent: Jun. 12, 2012

(54) METHOD, DEVICE AND TOOL FOR CLEANING, SURVEYING, INSPECTING, ETC. UNPIGGABLE PIPELINES

(75) Inventors: Uwe Strohmeier, Leimen (DE); Gunnar Kopp, Houston, TX (US)

(73) Assignee: PII Pipetronix GmbH, Stutensee (DE)

( * ) Notice: Subject to any disclaimer, the term of this patent is extended or adjusted under 35 U.S.C. 154(b) by 941 days.

(21) Appl. No.: 11/596,623

(22) PCT Filed: May 28, 2004

(86) PCT No.: PCT/EP2004/005817
§ 371 (c)(1),
(2), (4) Date: Nov. 21, 2007

(87) PCT Pub. No.: WO2005/119117
PCT Pub. Date: Dec. 15, 2005

(65) Prior Publication Data
US 2008/0072963 A1      Mar. 27, 2008

(51) Int. Cl.
*B08B 9/04*      (2006.01)
(52) U.S. Cl. ............ 134/166 R; 134/167 R; 134/167 C; 15/104.03; 15/104.05; 15/104.063
(58) Field of Classification Search ............ 134/6–9, 134/22.1–22.19, 23, 24, 42, 93, 113, 166 R, 134/167 R, 168 R, 168 C, 167 C, 166 C, 134/172–181, 198, 201; 15/104.03, 104.05, 15/104.061, 104.063, 104.066, 104.067
See application file for complete search history.

(56) References Cited

U.S. PATENT DOCUMENTS

| | | | |
|---|---|---|---|
| 3,299,459 A | 1/1967 | Mccune | |
| 4,649,948 A | 3/1987 | Hudson | |
| 5,025,670 A | 6/1991 | Mcnulty | |
| 5,208,937 A * | 5/1993 | Cooper | 15/104.062 |
| 5,769,955 A * | 6/1998 | Kozisek | 134/8 |
| 6,198,277 B1 | 3/2001 | Rave | |
| 7,246,634 B2 * | 7/2007 | Maier et al. | 137/318 |

FOREIGN PATENT DOCUMENTS

| | | |
|---|---|---|
| DE | 197 46 511 | 4/1999 |
| EP | 0 105 418 | 4/1984 |
| EP | 0 426 871 | 5/1991 |
| GB | 2 247 504 | 3/1992 |
| JP | 62123292 | 8/1987 |
| JP | 1105092 | 4/1989 |
| JP | 5062116 | 8/1993 |
| JP | 6182307 | 7/1994 |
| JP | 2002 224875 | 8/2002 |
| WO | WO 01/18442 | 3/2001 |
| WO | WO 01/76780 | 10/2001 |
| WO | WO 03/062695 * | 7/2003 |
| WO | WO 03/076841 | 9/2003 |

* cited by examiner

Primary Examiner — Michael Kornakov
Assistant Examiner — Ryan Coleman
(74) Attorney, Agent, or Firm — McGlew and Tuttle, P.C.

(57) ABSTRACT

The invention relates to a method for introducing a pig-like tool into an operating pipeline, such as a fluid pipe. According to the invention the pipeline is drilled during operation and the tool is injected into the pipeline through the drilled hole. During a corresponding tool removal from the pipeline a method is provided for prereconnaissance for the determination of a degree of contamination, cleaning, surveying, inspecting, repairing, etc. of pipelines by means of a corresponding, pig-like tool. The invention also relates to a device and a tool permitting the performance of the inventive method. Thus, otherwise unpiggable pipelines can be worked in a cost-efficient manner.

38 Claims, 9 Drawing Sheets

METHOD, DEVICE AND TOOL FOR CLEANING, SURVEYING, INSPECTING, ETC. UNPIGGABLE PIPELINES

This application is the national stage of PCT/EP2004/005817 filed on May 28, 2004.

BACKGROUND OF THE INVENTION

The invention relates to a method for introducing a pig-like tool into a pipeline which is operating, such as a fluid pipe. The invention also relates to a method for collecting data concerning such an operating pipeline. The invention also relates to a device for introducing a pig-like tool into an operating pipeline, such as a fluid pipe. The invention finally relates to a tool for introduction into such a pipeline, particularly according to one of the aforementioned methods and/or using an aforementioned device. A fluid pipe according to the invention can carry gases or liquids and in the latter case more particularly oil.

Nowadays preferably use is made of so-called pigs or scrapers for cleaning, surveying or inspecting pipelines, particularly gas or oil pipelines laid underground. Such a scraper can be generally defined as a travel or fitting member, which can pass through a pipeline with its own drive or using external energy in order to perform certain tasks. The degree of suitability of a pipeline for a pig passage is also referred to as piggability. Piggable pipe-lines are those which fulfil specific requirements of pig operation, particularly also with respect to welding technology and installation. In addition, a piggable pipeline must have at least one so-called pig station or lock, which is a fitting for inserting or removing one or more pigs with respect to a pipeline.

Since the appearance of intelligent pigs, i.e. those not solely comprising mechanical components, but also having an electrical/electronic part and which can therefore acquire, process, store and transmit measurement data, certain types of pipelines are regularly provided with such pig stations in order to be able to e.g. carry out cleaning or inspection on work without having direct access to the pipeline, i.e. without digging up the pipeline with the resulting cost disadvantage.

However, there are still numerous old pipes, which e.g. in the case of gas pipes in cities, can be 90 to 100 years old and where there is virtually no information concerning their condition. Such pipelines are buried in the ground regularly at a depth of around 1 to 2 m, whilst the depth under roads can be 4 or 5 m. In addition, such pipelines often have numerous valves or slide valves and travel with closely restricted bends, so that e.g. pipelines are frequently categorized as unpiggable. Hitherto direct access to such pipes, e.g. for cleaning, surveying or inspection purposes, has only been possible from the outside, which more particularly in cities involves very high effort and expenditure.

The problem of the invention is to provide a method through whose use the aforementioned disadvantages can be avoided in conjunction with work on hitherto unpiggable pipelines. The further problem of the invention is to provide a device usable with such a method and to provide a corresponding tool.

SUMMARY OF THE INVENTION

The problem is solved by a method for introducing a pig-like tool into an operating pipeline, such as a fluid pipe, the pipeline being drilled during operation and the tool is injected into the pipeline through the drilled hole, i.e. without the medium flow in the pipe being interrupted. According to the invention a pig is injected into a pipeline without flow interruption by fitting a so-called hot tap, only a locally defined access to the pipeline being necessary.

In order to facilitate the introduction of the tool into the pipeline, according to a first development of the inventive method, the drilling of the pipeline and the injection of the tool takes place under an angle between 30 and 90ø, from approximately 45ø relative to a longitudinal axis of the pipeline, preferably between 30 and 60ø and in particular at approximately 45ø. For the same reason, prior to the introduction of the tool into the pipeline a guide assembly for the tool is at least partly introduced into the same.

In order to be able to reliably use the inventive method even in the case of relatively high operating pressures in the pipeline, according to a highly preferred development of the inventive method, at least the guide assembly is held in position by a holding device counter to an operating pressure in the pipeline. The tool can also be injected into the pipeline from a transportation/storage container connected to at least the guide assembly.

The aforementioned set problem is also solved by a method for cleaning, surveying, inspecting, repairing, etc. pipe-lines by means of a corresponding pig-like tool, the latter being introduced into the pipeline in accordance with one of the aforementioned methods and is correspondingly removed from the pipeline again. Thus, according to the invention, quasi random sections of unpiggable pipelines can be inexpensively worked. Within the scope of an extremely preferred development of the inventive method, for bridging obstacles in the pipeline for the tool, such as a slide valve or the like, on either side of the obstacle drillings are performed on the pipeline and connected by a bypass pipeline for the tool.

The aforementioned problem is also solved by a method for collecting data concerning an operating pipeline, such as a fluid pipe or the like, and comprising the following steps:

a) performing a first prereconnaissance for establishing at least a degree of dirtying of the pipeline into which is introduced a reconnaissance device small compared with a decisive pipeline dimension, such as a diameter;

b) optionally in the case of a substantially cleaner pipe-line cleanable with standard cleaning methods, such as the use of metal brushes or chemical cleaning procedures, the performance of a further prereconnaissance for establishing. a geometrical state of the pipeline as in step a);

c) optionally in the case of a pipeline not cleanable using standard cleaning procedures or a pipeline with damaged geometry working out corresponding, specific cleaning or geometry repair methods optionally together with a customer;

d) optionally in connection with step c), performance of an evaluation as to whether the worked out special method or methods can be performed cost-efficiently;

e) optionally in the case of a positive evaluation in step d) performance of the worked out special method or methods;

f) alternatively to step c) or following onto step e) performance of at least one of the above-described, inventive methods;

g) optionally in the case of a negative evaluation in step d) performance of at least one alternative method, particularly for exposing and for expert appraisal of the pipeline from the outside and/or for the hydrostatic monitoring of the pipeline.

Thus, the above-described methods for using pig-like tools in operating pipelines form part of a complete method sequence aiming at collecting data concerning a substantially unknown pipeline in an optimum use-specific adapted manner and with minimum costs for the contractor.

For solving the above-defined method the invention also provides a device of the aforementioned type with a guide assembly at least partly introduceable into a drilled hole of the pipeline having a substantially straight first pipe part and which at least in an introduction section is at an angle to the pipeline longitudinal axis and which has a curved, channel-shaped extension, which in the introduced state engages on a pipeline wall facing the drilled-hole. Thus, according to the invention, the tool can be introduced into the pipeline without there being a hard abutment of the tool against the pipeline wall. Instead the curved guide assembly extension ensures that the tool on penetrating the pipeline has a velocity substantially solely in the pipeline longitudinal axis direction. To this end, according to a highly preferred development of the inventive device, the curved guide assembly extension is provided in the engagement area with a tangent parallel to the pipeline longitudinal axis.

In addition, according to a further development of the inventive device, it has an inside bulge extending over a partial circumference of the first pipe part and substantially diametrically faces the extension. This inside bulge ensures that the tool is continuously guided around an edge formed on the rim of the pipeline drilled hole, without there being any sticking or damage to the tool. For the aforementioned reasons the angle between the pipeline longitudinal axis and the substantially straight path of the. first pipe part is preferably 45° (or also between 30 and 45° or between 45 and 90°).

According to a preferred development of the inventive device the guide assembly has on its end remote from the introduction section a further curved pipe part with a path bending away from the running direction of the first pipe part, the bend preferably being substantially 90°. Thus, according to the invention, it is possible to reduce the mechanical loading of the pipeline and the guide assembly on introducing the tool into the latter, particularly if, according to a further development of the inventive device, in the introduced state of the guide assembly a running direction of the second pipe part on its end remote from the first pipe part is oriented at least locally in a plane substantially parallel to a running plane of the pipeline. Advantageously the running direction of the second pipe part at its end remote from the first pipe part is oriented under an angle of substantially 90° with respect to the pipeline longitudinal axis, so that the tool can be introduced into the guide assembly transversely to the pipeline longitudinal axis.

In order to be able to insert the tool in an operating, pressurized pipeline, according to an extremely preferred further development, the inventive device is provided in a joint area between the first and second pipe parts with a sealing means, which is preferably constructed in the form of a slide valve for the pressure-tight sealing of the guide assembly. A transportation/storage container connectable to the end of the guide assembly remote from the introduction section can be provided for the tool. After fitting the transportation/storage container and the optional opening of the sealing means, the tool can preferably be injected into the pipeline through the guide assembly from the transportation/storage container.

In conjunction with a particularly preferred development of the inventive device, the transportation/storage container is placed on a load bearing or carrying device, so that only very small mechanical forces act on the guide assembly and the pipeline. The load carrying device is movable and in particular travelable. In an extremely preferred development of the inventive device, the load carrying device. is a flat-bed or a flat-bed trailer.

In order to be able to keep the guide assembly in position against an operating pressure in the pipeline, the inventive device preferably has a corresponding holding device which, according to a further development of the inventive device, can be constructed as a ram means acting from the outside on the guide assembly. According to a variant of the inventive device, for acting on the guide assembly the holding device is constructed in the vicinity of the bend of the second pipe part thereof.

For a reliable, defined introduction of the guide assembly into the pipeline, according to a particularly preferred development of the inventive device, there is a bush with flange extension fittable to the pipeline and which is permanently fixed thereto during its drilling, more particularly by welding. According to a further development of the inventive device, the sealing means and holding device can be jointly connected to the flange extension of said bush and in particular the sealing means and holding device constitute a structural unit.

For solving the set problem the invention also proposes a tool in the form of a flexible, multimember pig, whose functional members, such as the pulling unit, magnetizing arrangements, sensor supports, etc., have dimensions in the pig longitudinal direction such that it is possible to travel through pipeline sections with a radius of curvature of the order of magnitude of a pipeline diameter. Such a tool construction is vital in order to be able to introduce it from the transportation/storage container through the guide assembly into the pipeline.

According to a highly preferred development of the inventive tool, its functional members have in each case inwardly and outwardly swingable support arm arrangements for the functional elements, such as sealing sleeves, magnetizers or sensors. This makes it possible to flexibly adapt the shape and in particular the diameter of the tool functional members, so that it is possible to bypass obstacles in the pipeline, such as in the introduction section of the guide assembly into said pipeline. Moreover, an inventive tool constructed in this way can also be used in so-called multidiameter applications, in which a pipeline in known or unknown manner has a non-constant diameter, the support arm arrangements ensuring that the functional members at all times assume their optimum working spacing from the pipeline wall.

For safety reasons the inventive tool can have two successively arranged pulling units, which in a passive development of the tool can be conventional sealing sleeves, which as a result of the pressure of the medium flowing through the pipeline ensure a tool movement. Alternatively the pulling units can be constructed as actively driven tractors and have corresponding drive means such as wheels, motors and a corresponding power supply. It is also inventively possible to provide "intelligent" pulling units in the form of robots, which can in particular effect an independent adaptation to the pipeline geometry.

If when inspecting the pipeline use is made of magnetic inspection methods, such as magnetic flux leakage, so that corresponding magnetizing arrangements are provided on the tool, according to a highly preferred development of the inventive tool, the magnetizing arrangements are formed by shortened magnetizers. Hereinafter the term conventional magnetizing arrangements is understood to mean arrangements for magnetizers of a specific length normally used for a given pipeline diameter. Through the use of smaller magnets for a given diameter, naturally less magnetic power is available for pipeline inspection, but the possibly existing disadvantages with regards to measurement accuracy pass into the background when compared with the inventive unavoidable flexibility of the arrangement which is obtained.

In order to reduce wear to the tool in the vicinity of the magnetizing arrangements, particularly with a view to an active pig with tractor pulling units, according to a further development roll or roller means are integrated into the magnetizing arrangements.

To bring about a complete coverage of the pipeline wall in multidiameter applications, according to an extremely preferred development of the inventive tool, at least two successively provided magnetizing arrangements exist and their magnetizers are circumferentially offset.

BRIEF DESCRIPTION OF THE DRAWING

Further advantages and characteristic of the invention can be gathered from the following description of embodiments relative to the attached drawings, wherein show:

FIG. 5a, b Detail views of an inventive guide assembly.

DESCRIPTION OF THE PREFERRED EMBODIMENT

Figure 1:
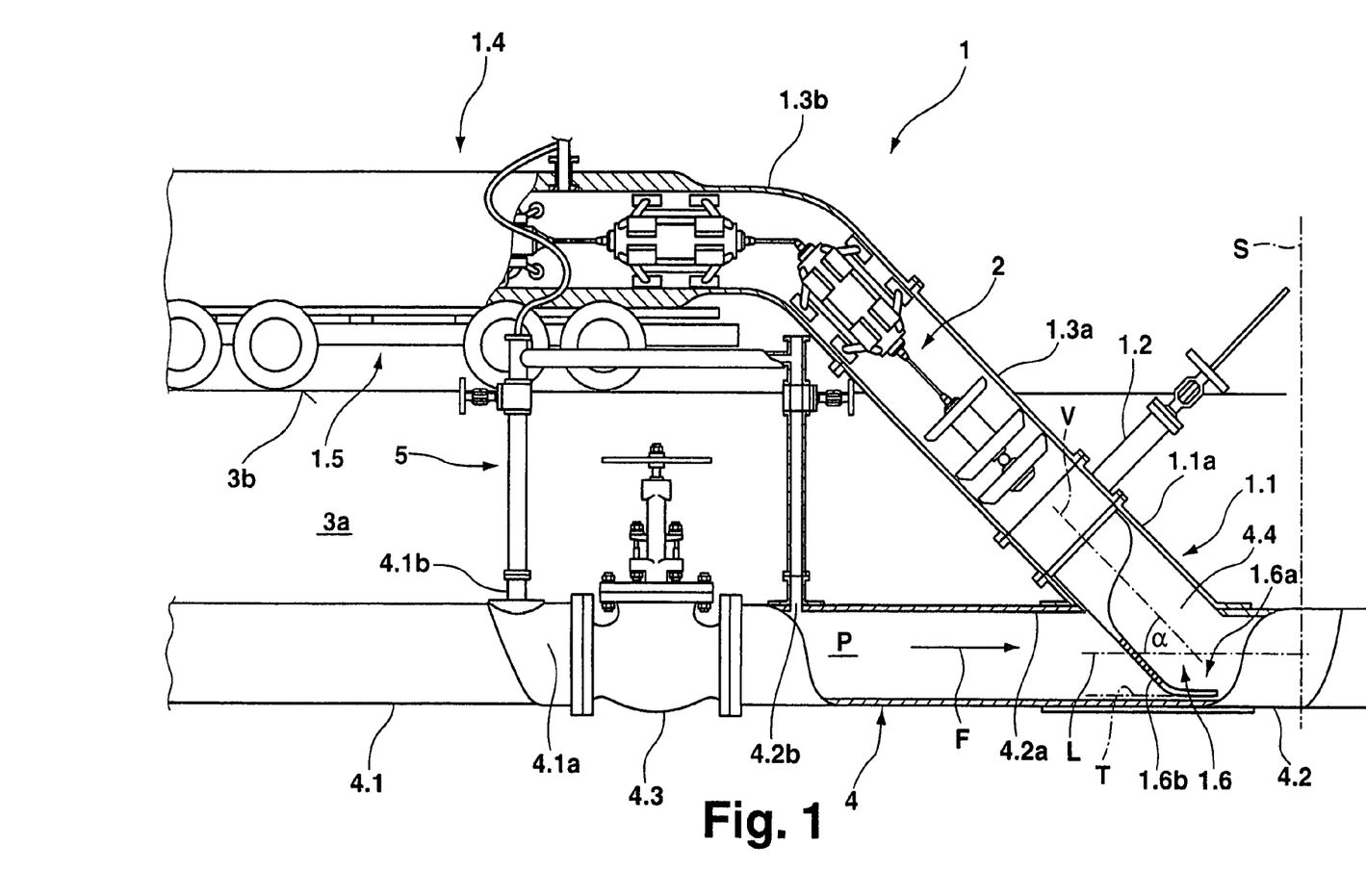
FIG. 1 By means of a diagrammatic representation, an inventive device and an inventive tool for performing an inventive method.

FIG. 1 diagrammatically illustrates the performance of an inventive method using an inventive device 1 and an inventive tool 2. It is firstly possible to see a pipeline 4 laid in the ground 3a, i.e. below the ground or road surface 3b and in this case a gas pipeline through which flows a gaseous fluid in the direction of arrow F and in which the gas is under an operating pressure p.

According to FIG. 1 the pipeline 4 comprises several portions 4.1, 4.2 linked by means of a valve 4.3. As a result of cross-sectional constrictions of the pipeline 4 in the interior of valve 4.3 such a pipeline 4 is also referred to as unpiggable. On the wall 4.1a, 4.2a the portions 4.1, 4.2 have radially outgoing branches 4.1b, 4.2b. The branches 4.1b, 4.2b can be subsequently fitted to the pipeline 4 (see below) and according to FIG. 1 are connected to a pipe valve arrangement 5 in conjunction with a prereconnaissance (see below, FIG. 9).

In order to be able to perform inspection and maintenance work using pig-like tools 2 in fundamentally unpiggable pipelines 4 for cost saving reasons, use can be made of the inventive device 1 diagrammatically shown in FIG. 1 and which is described in greater detail hereinafter, particularly relative to FIGS. 3 to 6. It firstly comprises a bush 1.1 with flange extension 1.1a, which at the location of a drilled hole 4.4 in pipeline 4 is fixed, preferably welding to the latter. A running direction V of the pipe-like flange extension 1.1a and the longitudinal axis L of pipeline 4 form a angle α and in the embodiment shown α is preferably approximately 45°. According to the development shown in FIG. 1, a sealing means in the form of a slide valve 1.2 is flanged to flange extension 1.1a and as a result thereof the drilled hole 4.4 of pipeline 4 or the flange extension 1.1a (a so-called hot tap) can be sealed in pressure-tight manner. To slide valve 1.2 are connected in the embodiment of FIG. 1 further, optionally flexible pipe parts 1.3a, 1.3b, by means of which the flange extension 1.1a or pipeline 4 are connected to a transportation/storage container 1.4 for the tool 2. The transportation storage container 1.4 is placed on a travelling load carrying device in the form of a flat-bed. From the transportation/storage container 1.4 the tool 2 can be injected by means of inventive device 1 into the pipeline 4, as will be shown in greater detail hereinafter relative to FIG. 2.

For the reliable, defined introduction of tool 2 into pipeline 4, the inventive device 1 according to FIG. 1 also has a further pipe part 1.6 functioning as part of a guide assembly (cf. for detailed explanation FIGS. 3 to 6), which has a curved extension 1.6a and which in the introduced state shown is in engagement with the pipe wall 4.2a in an area thereof facing the drilled hole 4.4 of pipeline 4. The curved extension 1.6a has in this area a tangent T substantially parallel to the pipeline longitudinal axis L. In the vicinity of extension 1.6a pipe part 1.6 also has openings 1.6b, so that the medium in pipeline 4 can flow or pass unhindered in arrow direction F through extension 1.6a.

Thus, from the method standpoint and optionally following a corresponding prereconnaissance via branches 4.1b, 4.2b and pipe valve arrangement 5, the pipeline 4 is drilled under an angle of e.g. α~45° (drilled hole 4.4). In the vicinity of the drilled hole 4.4 the bush 1.1 with flange extension 1.1a and slide valve 1.2 fixed thereto is installed for sealing the drilled hole 4.4. By means of further pipe parts 1.3a, 1.3b described in greater detail hereinafter, the pipeline 4 when the slide valve 1.2 is open is linked with the transportation/storage container 1.4 for inventive tool 2.

Tool 2 is a novel, pig-like tool, explained in greater detail hereinafter relative to FIGS. 7a to 8b. Fundamentally said tool can be a pig with a random functionality, e.g. a cleaning pig, a caliper or measuring pig, an inspection pig (e.g. with magnetizers and magnetic field sensors), etc.

As a result of its special design with curved extension. 1.6a, pipe part 1.6 serves to guide the tool 2 around the bend or kink between the inserted device 1 and pipeline 4 in the vicinity of drilled hole 4.4, without there being any damage or jamming to tool 2.

The diagrammatic representation of FIG. 1 shows the use of an inventive device 1 for injecting the tool 2 into the unpiggable pipeline 4. For removing tool 2 from pipeline 4 a further arrangement reflected on a vertical axis of symmetry F is provided further downstream in the direction of arrow F. According to the invention, it is also possible to bypass unpiggable passages of pipeline 4, such as valve 4.3, by providing a further, not shown drilled hole in the vicinity of portion 4.1 of pipeline 4 and using further pipe parts corresponding to pipe parts 1.3a, 1.3b in the manner of a piggable bypass.

Figure 2:
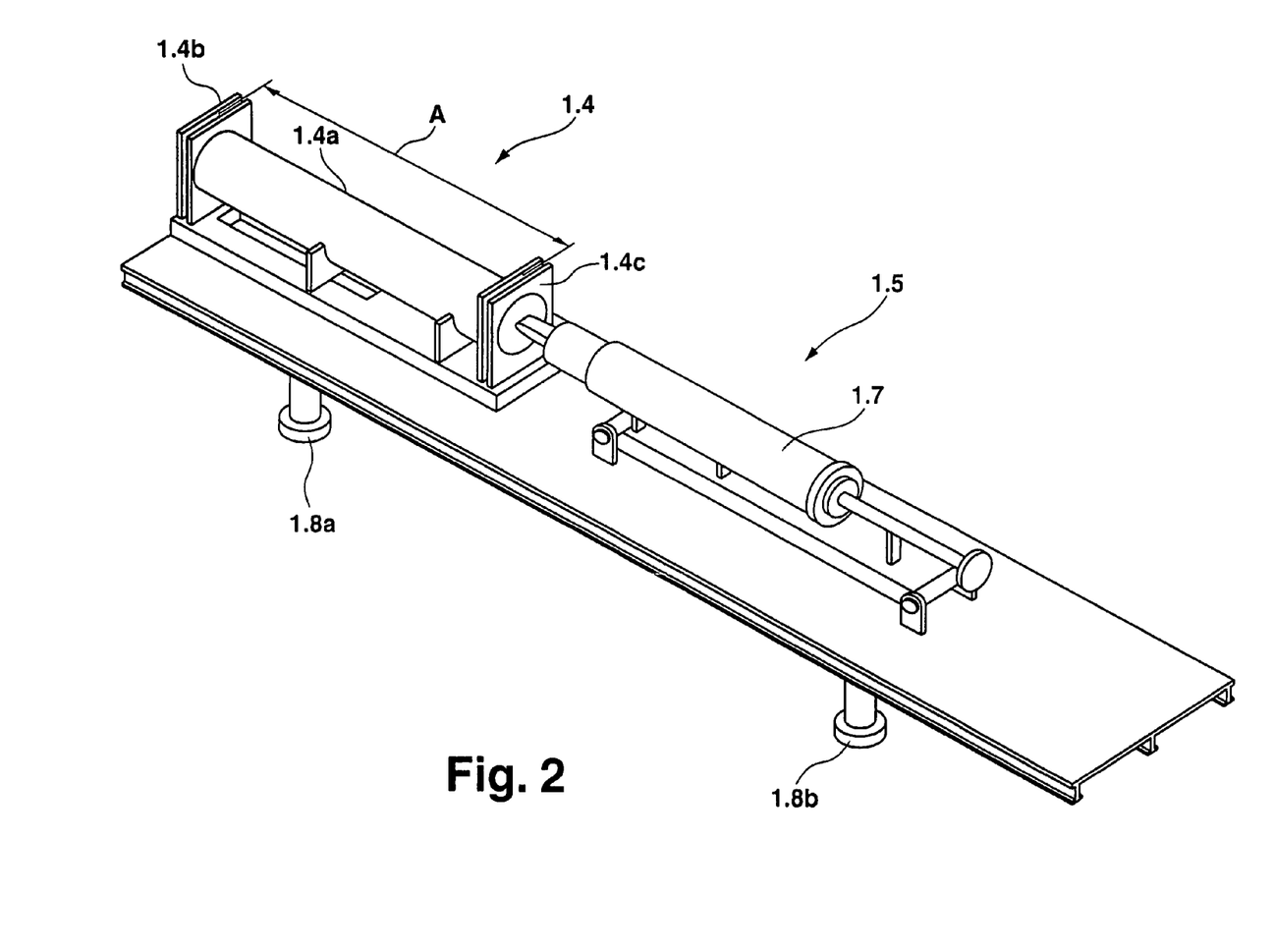
FIG. 2 In a perspective overall view the load carrying device of FIG. 1.

FIG. 2 shows in detail in a perspective overall view a further development of the transportation/storage container 1.4 for tool 2 (cf. FIG. 1) and the associated load carrying device 1.5, which according to FIG. 1 can be placed on a travelling base in the manner of a flat-bed. According to FIG. 2 the transportation/storage container 1.4 appears like a further pipe section 1.4a, whose length dimension A at least corresponds to the length of tool 2. At its ends container 1.4 has flanges 1.4b, 1.4c, flange 1.4b being used for connecting container 1.4 to further elements of inventive device 1 (cf. FIG. 1).

From load carrying device 1.5 is also provided in the manner of an "injection needle" a preferably pneumatically or hydraulically operated cylinder 1.7 used for injecting tool 2 (cf. FIG. 1) from container 1.4 into pipeline 4.

In addition, the load carrying device 1.5 has an arrangement of preferably hydraulically or pneumatically operated telescopic legs 1.8a, 1.8b through which it is possible to adjust a position of the load carrying device 1.5 and in particular container 1.4 in such a way that in the inventive device 1 according to FIG. 1 there are minimum mechanical stresses and in the vicinity of bush 1.1 or drilled hole 4.4 there is only a minimum load-lever action as a result of the further elements of device 1 and the tool 2 to be inserted. Thus, during the performance of the inventive method, maximum pipeline operating security is ensured.

In a detailed sectional view FIG. 3 again shows a development of inventive device 1 (cf. FIG. 1). With an assumed flow direction F through pipeline 4, the inventive device 1 is constructed in accordance with FIG. 1 for introducing a tool into pipeline 4. With an assumed flow direction F' through pipeline 4, the device 1 of FIG. 3 is used for receiving a tool moved through the pipeline 4, e.g. after cleaning or surveying of the latter has taken place.

Figure 3:
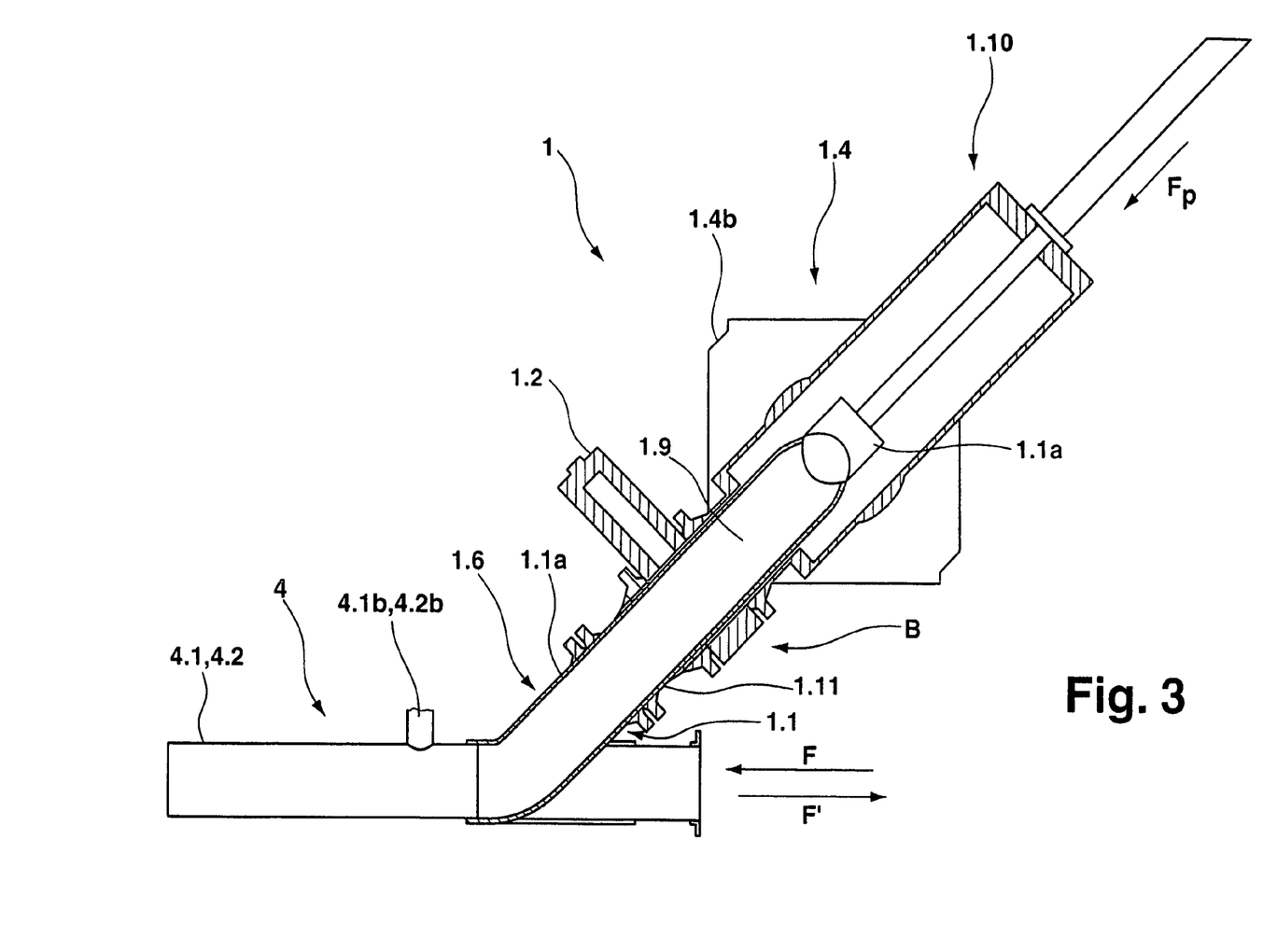
FIG. 3 A cross-section through an inventive guide assembly.

Fundamentally the inventive device shown in FIG. 3 corresponds to that of FIG. 1 and corresponding components are given the same references. However, diverging from the diagrammatic representation of FIG. 1, FIG. 3 has following onto the first pipe part 1.6 with curved extension 1.6a (cf. FIG. 1) a further curved pipe part 1.9 connected to the first pipe part 1.6. The further pipe part 1.9 initially assumes the path V (cf. FIG. 1) of the first pipe part 1.6 and then bends off substantially rearwards at right angles in the drawing plane, so that in an assumed plan view there is a substantially L-shaped path of the arrangement comprising pipe parts 1.6 and 1.9. The transportation/storage container 1.4 is connected to pipe part 1.9 at its end remote from the first pipe part 1.6 and therefore its introduction section into pipeline 4. Thus, accordingly the pipe part 1.9 of the development shown in FIG. 3 functionally essentially assumes the function of pipe parts 1.3a and 1.3b shown in FIG. 1.

The slide valve 1.2 already illustrated by means of FIG. 1 is, according to the development of FIG. 3, placed in a joining area B between the first 1.6 and second pipe part 1.9 and consequently again permits a pressure-tight sealing of the arrangement of the two pipe parts 1.6, 1.9 functioning as a guide assembly for tool 2 (cf. FIG. 1).

The development of the inventive device 1 according to FIG. 3 has the advantage that container 1.4 for tool 2 and the not shown load carrying device 1.5 are not located in an area above the pipeline 4, but instead laterally or rearwardly displaced with respect thereto, so that mechanical actions on pipeline 4 are minimized.

In order to keep the arrangement of pipelines 1.6, 1.9 in position counter to the operating pressure P in pipeline 4, according to FIG. 3 in the vicinity of the bend of pipe part 1.9 there is a holding device in the form of a hydraulic ram 1.10, which is flanged together with slide valve 1.2 to flange extension 1.1a of bush 1.1. Additionally, in not shown manner the holding device 1.10 is preferably connected to container 1.4 or load carrying device 1.5, so that the bush 1.1 or pipeline 4 do not have to carry the weight of the arrangement formed by slide valve 1.2 and holding device 1.10.

According to FIG. 3 the ram 1.10 acts by means of its ram body 1.10a on pipe part 1.9 in the vicinity of its bend and in parts thereto a force $F_p$ in the direction of the arrow in FIG. 3 through which the guide assembly for tool 2 formed form pipe parts 1.6, 1.9 is held in position counter to the operating pressure P in pipeline 4.

Figure 4:
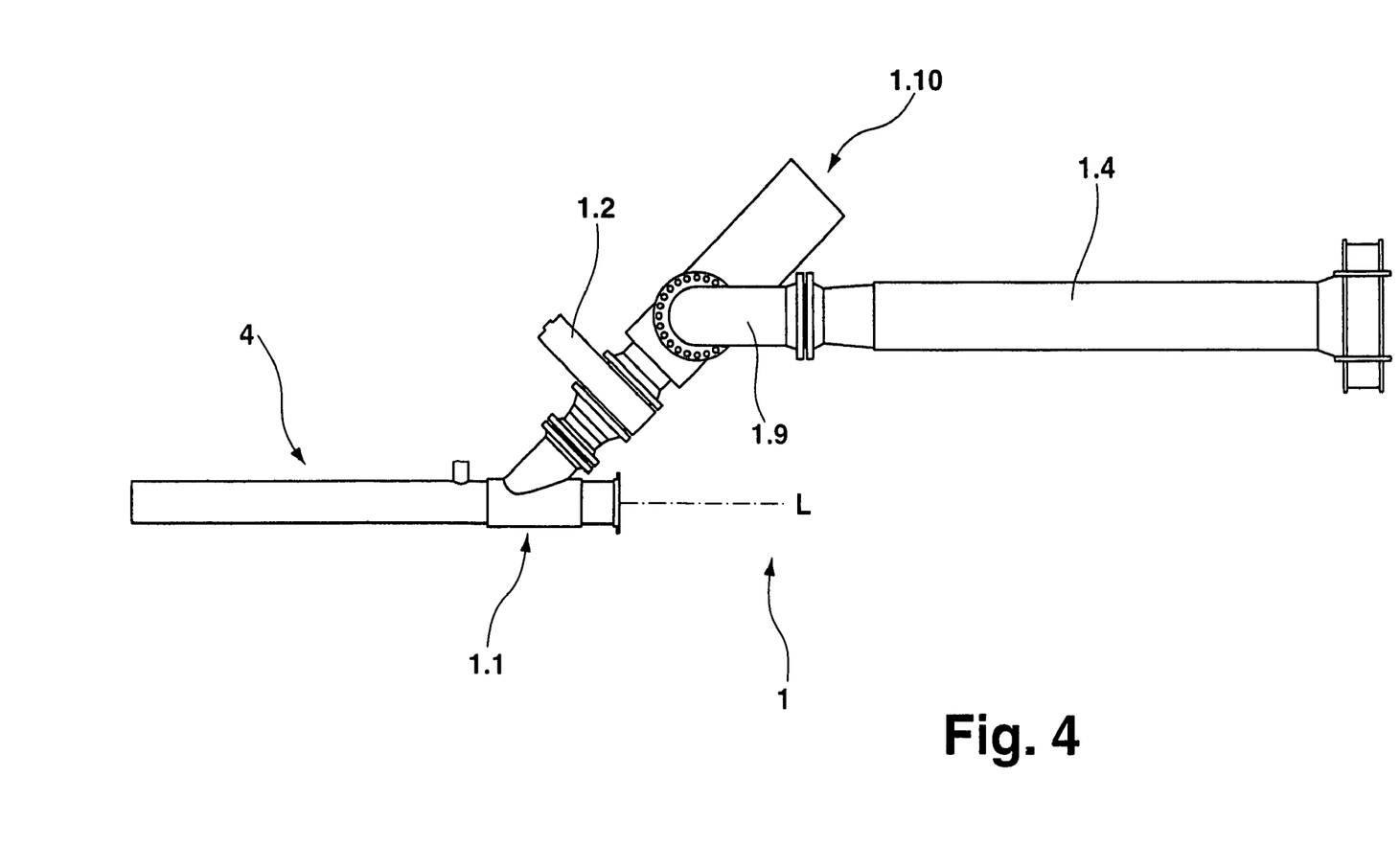
FIG. 4 A side view of the guide assembly of FIG. 3.

FIG. 4 shows an alternative development of the inventive device 1 and where differing from FIG. 3 the transportation/storage container 1.4 for tool 2 is oriented parallel to the pipeline longitudinal axis L. This is essentially brought about in that in the development according to FIG. 4 the second pipe part 1.9 has a further 90° bend (to the right coming from the plane). Such a development correspondingly makes high demands on the flexibility of a tool usable according to the present invention (cf. FIGS. 7a to 8b).

Figures 5A, 5B:
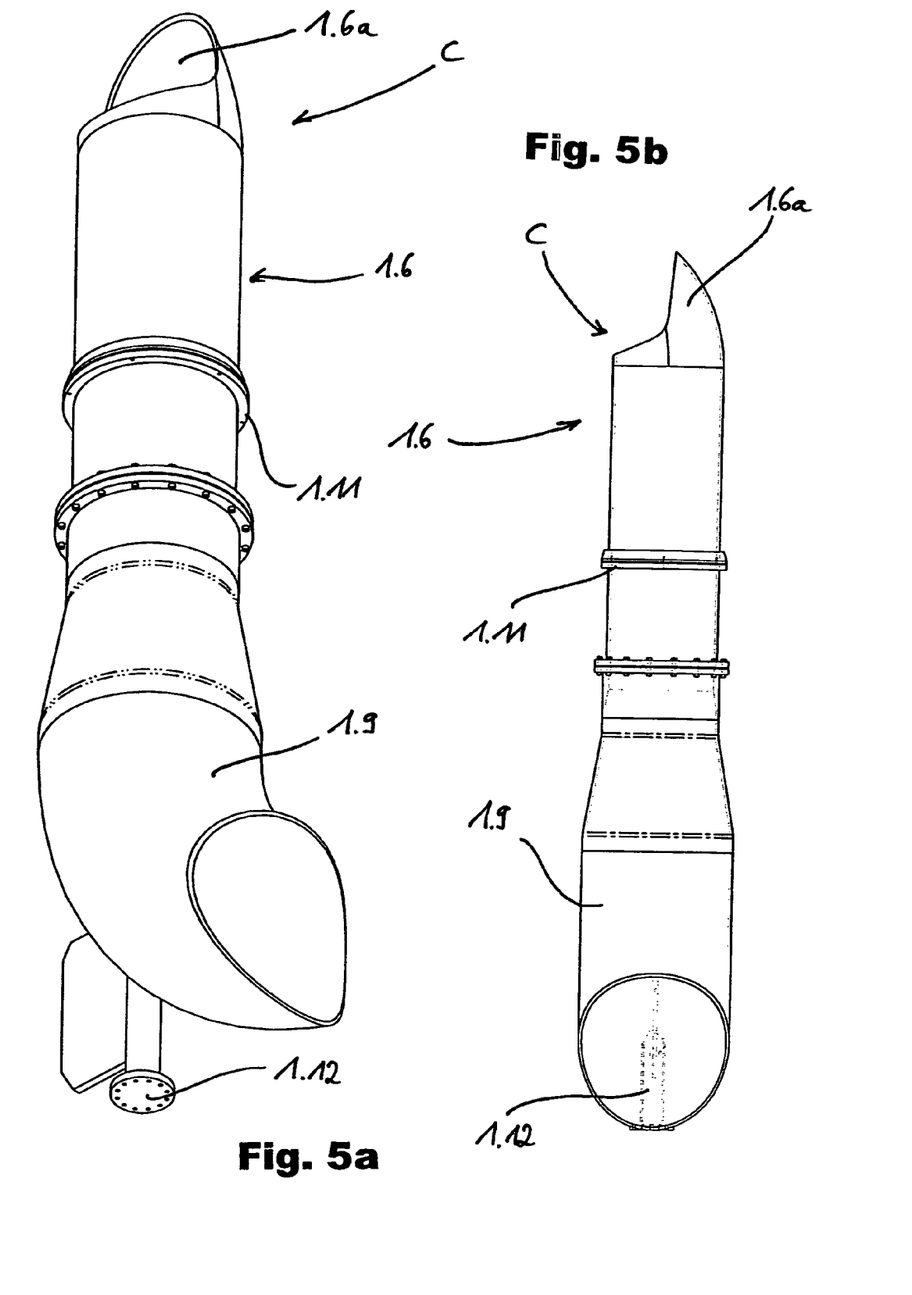

FIGS. 5a, b show in detail a possible development of the guide assembly of device 1 formed from pipe parts 1.6 and 1.9 (cf. FIG. 3). It is readily possible to see in FIGS. 5a, b the curved, specifically channel or spoon-shaped construction of extension 1.6a of first pipe part 1.6 in its introduction section C, i.e. the section of the pipe part 1.6 inserted in pipeline 4 (cf. FIG. 1) for performing the inventive method or when using the inventive device 1.

According to FIGS. 5a, b, an annular sealing body 1.11 can be placed on the first pipe part 1.6, so that according to FIG. 3 no fluid can pass out of the pipeline 4 past pipe part 1.6 into areas of the inventive device 1 located behind sealing body 1.11, such as the interior of slide valve 1.2 or holding device 1.10.

In the vicinity of its bend, the second pipe part 1.9 has a larger diameter compared with the first pipe part 1.6 so as to facilitate a passage of the tool in this area. Also in the vicinity of its bend, the pipe part 1.9 has a ram-like shoulder 1.12 serving as a bearing surface for a correspondingly shaped ram body 1.10a (cf. FIG. 3) of holding device 1.10, so as to keep in position the guide assembly formed from pipe parts 1.6 and 1.9.

Figure 6:
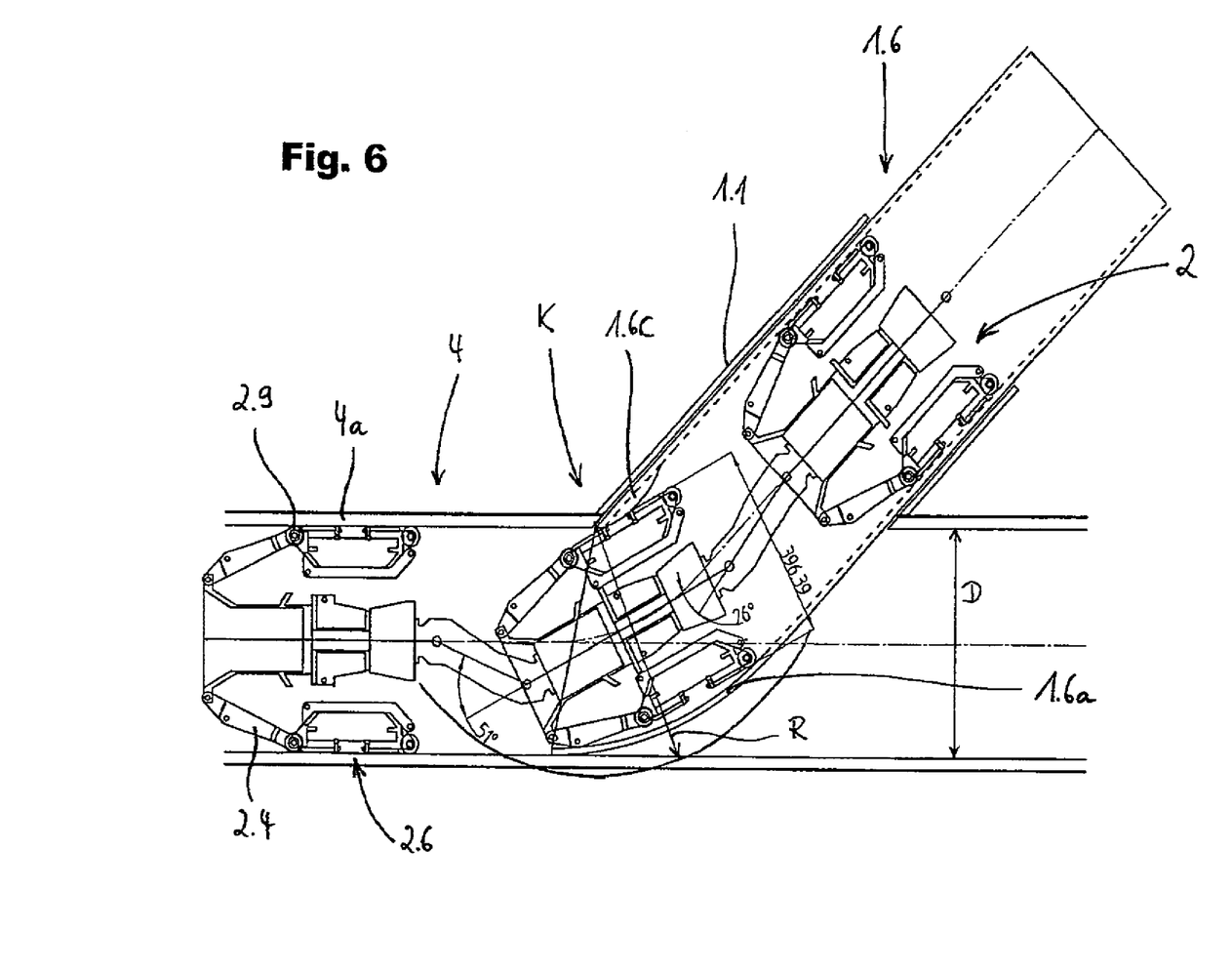
FIG. 6 In a cross-sectional representation, an inventive tool for introduction into a pipeline using an inventive guide assembly.

FIG. 6 shows an inventive tool 2 (cf. FIGS. 7a-8b) on insertion in a pipeline 4 using an inventive device 1 with a first pipe part 1.6 explained in detail hereinbefore relative to the preceding drawings. The radius of curvature R in the vicinity of the kink between pipe part 1.6 and pipeline 4 is only slightly more than the diameter D of pipeline 4 according to FIG. 6.

In order to avoid damage to the tool in the vicinity of an edge K of drilled hole 4.4 (cf. FIG. 1) of pipeline 4, pipe part 1.6 has an inside bulge 1.6c arranged in substantially diametrically facing manner with respect to extension 1.6a and extending over part of its circumference and which, as shown in FIG. 6, is so constructed and positioned that as soon as the tool 2 is inserted in pipeline 4 it comes free from the wall 4a of the latter in the vicinity of edge K.

Figure 7A:
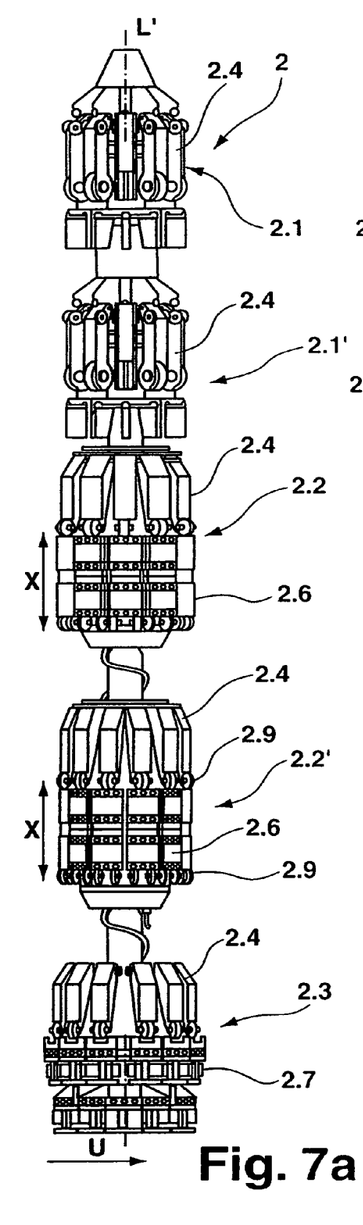
FIG. 7a An inventive tool in a first representation.
Figure 7B:
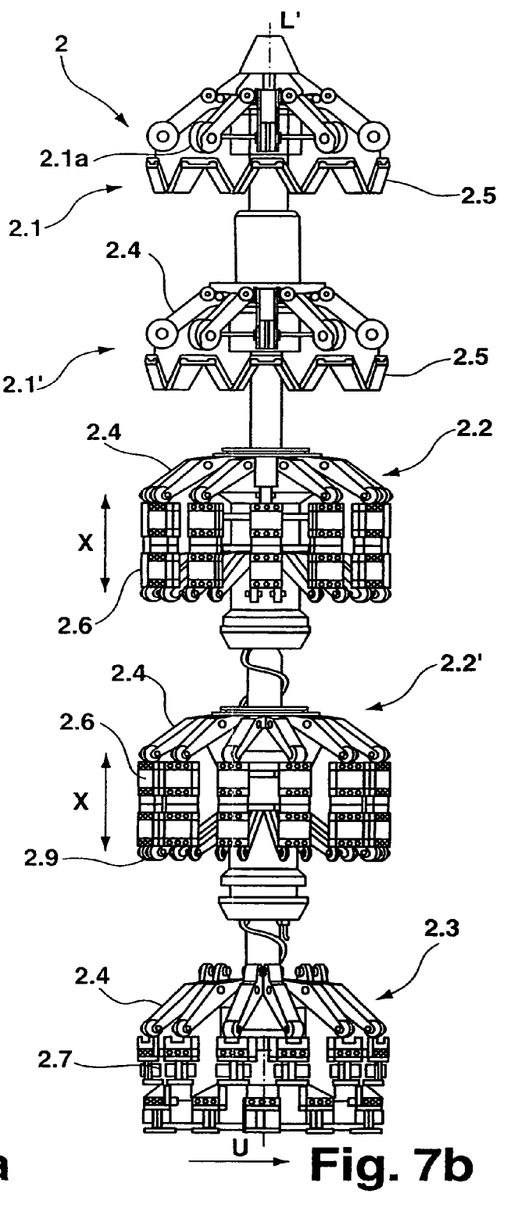
FIG. 7b The tool of FIG. 7a in a further representation.
Figure 8A:
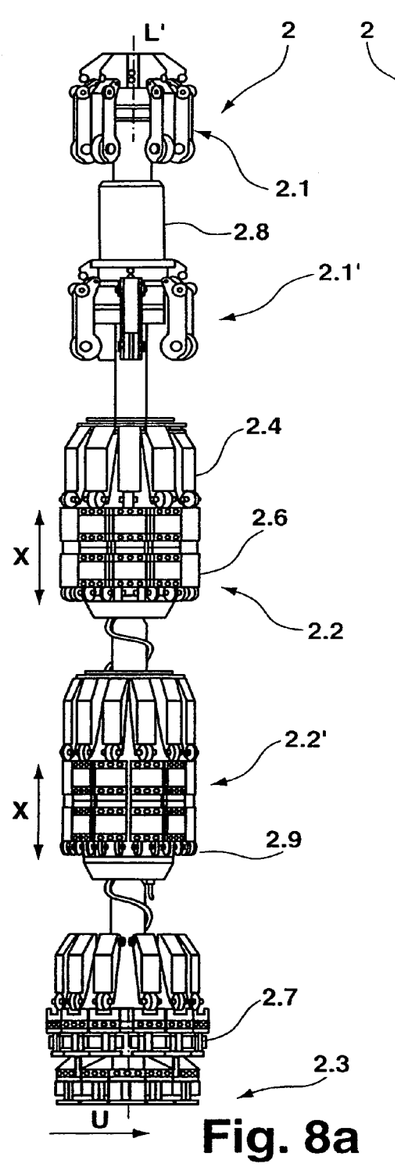
FIG. 8a A further inventive tool.
Figure 8B:
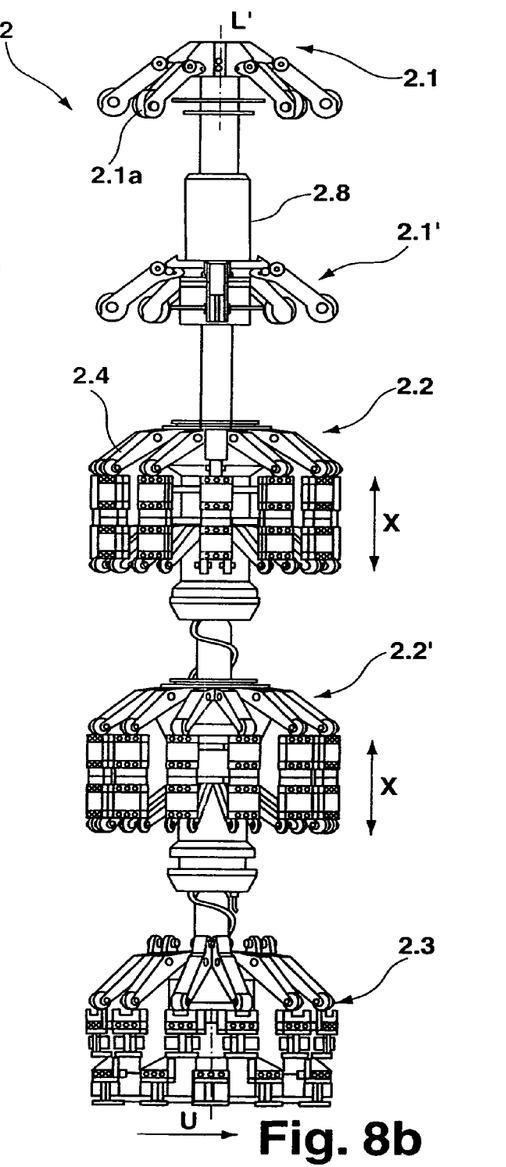
FIG. 8b The tool of FIG. 8a in a further representation.

FIGS. 7a, b and 8a, b show in detail possible developments of an inventive tool 2 for introduction into an operating pipeline 4, such as a gas or oil pipeline, particularly according to an inventive method and/or using an inventive device 1, as described in detail hereinbefore relative to FIGS. 1 to 6. Tool 2 is shaped like a flexible (cf. FIG. 6), multimember pig, whose functional members, such as pulling unit 2.1, 2.1', magnetizing arrangements 2.2, 2.2', sensor supports 2.3, etc., are provided in the longitudinal direction L' of pig 2 with dimensions X such that sections of the pipeline with a radius of curvature R of approximately a diameter D of the pipeline 4 can be traversed by the tool 2 (cf. FIG. 6). To this end the inventive tool 2 has in all its functional members 2.1, 2.1', 2.2, 2.2', 2.3 arrangements of inwardly and outwardly swingable support arms 2.4, on whose ends are located the functional elements, such as sealing sleeves 2.5, magnetizers 2.6 or (magnetic field) sensors 2.7.

Of decisive importance according to the invention is the shortened construction x of magnetizers 2.6 compared with conventional tools. If they are excessively long in the direction of the pig longitudinal axis L', it is no longer possible to traverse confined pipeline bends according to FIG. 6.

FIGS. 7a, 7b and 8a, 8b in each case show the same tool 2 with support arms 2.4 in each case inwardly/outwardly swung positions. As a result of this specific construction the inventive tool 2 can not only transverse the pipeline bends with confined radii of curvature R according to FIG. 6, with the support arms 2.4 swung in, but also can work general pipelines 4 with variable cross-section/diameter (multidiameter applications).

According to FIGS. 7a, b, the drawing or pulling units 2.1, 2.1', which are duplicated for security reasons, can be constructed as passive pulling units with the already described sealing sleeves 2.5, so that the tool moves forwards in a passive manner, i.e. is moved through the pipeline 4 together with the flowing medium. Alternatively, according to FIGS. 8a, 8b, the pulling units 2.1, 2.1' of tool 2 can be actively drawn tractors, where corresponding rolls 2.1a are driven by associated, not shown motor means for the active forward movement of the tool 2 through pipeline 4. For this purpose the tool 2 also has a battery body 2.8, which can also be used for the power supply for further electrical/electronic components of tool 2, such as magnetizers 2.6 or sensors 2.7.

As can also be seen in FIGS. 7a to 8b, the inventive tool 2 has at least two successive magnetizing arrangements 2.2, 2.2', whose magnetizers 2.6 in circumferential direction U are mutually offset. Thus, with the support arms 2.4 swung out (cf. FIG. 7b, 8b) there is a complete coverage of the pipeline wall, which is a further prerequisite for working in pipelines with a variable diameter D, particularly between 26 and 28 inches.

According to the developments of the inventive tool 2 shown, rolls 2.9 are integrated into the magnetizing arrangements 2.2, 2.2' and during the operation of the tool 2 engage with pipeline wall 4a (cf. FIG. 6). This reduces friction and wear, which particularly in the case of actively driven tools 2 (cf. FIGS. 8a, 8b) has considerable significance.

Figure 9:
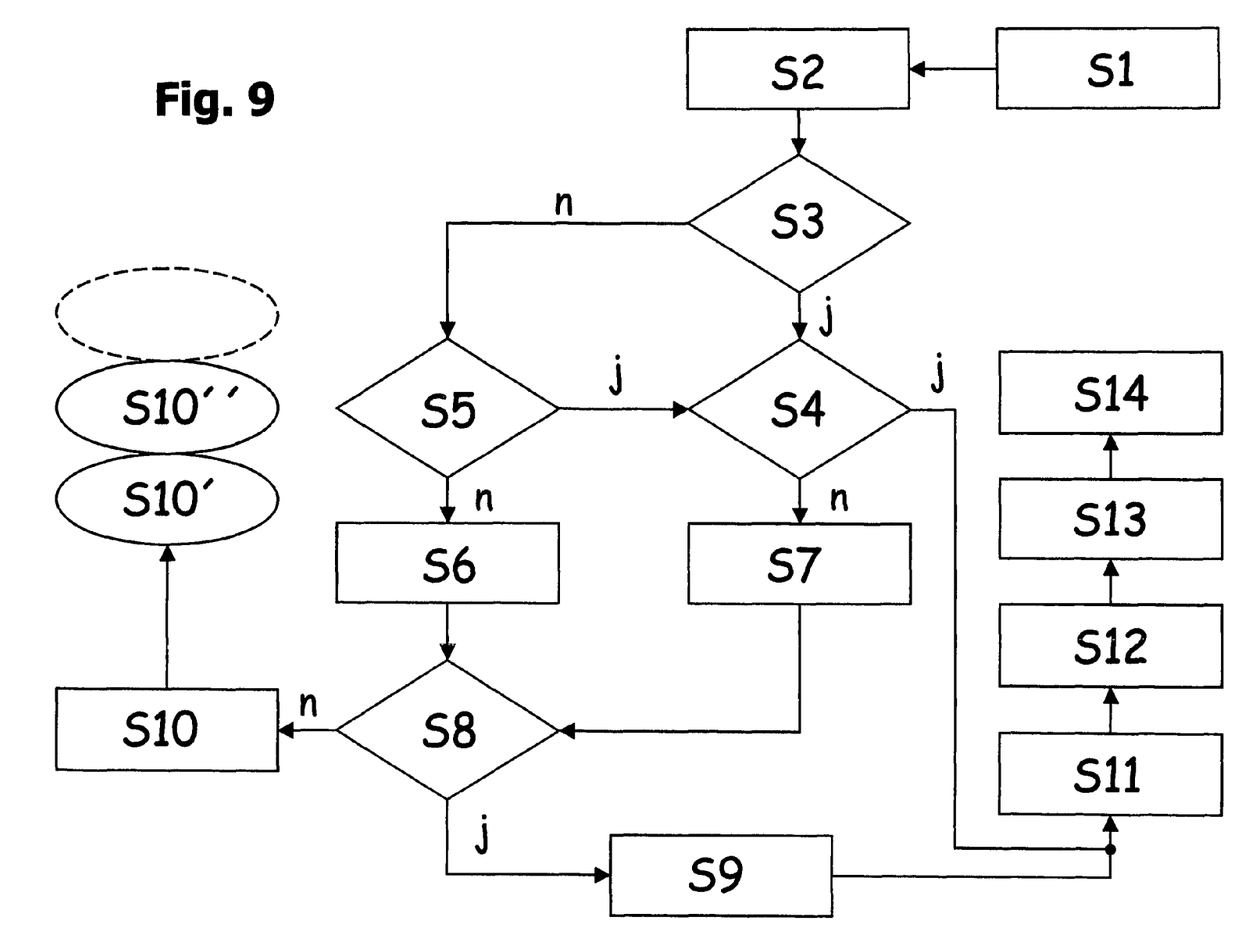
FIG. 9 A flow chart of an inventive method.

Finally, FIG. 9 shows a flow chart illustrating the sequence of the inventive method for collecting data concerning the operating pipeline 4, such as a gas pipeline or the like. The method begins in step S1 so that the pipeline 4 (cf. FIG. 1) is locally exposed and freed from any coatings present. In the same method step S1 tests are then performed in order to establish the state of the pipeline 4 and its suitability for fitting a hot tap. In a following method step S2 a prereconnaissance takes place for establishing a degree of dirtying and/or a geometrical state of the pipeline. To this end a hot melt with a diameter between 4 and 10 inches, preferably between 6 and 8 inches is fitted to the pipeline. Alternatively and is also shown in FIG. 1, use is made of an existing access to pipeline 4 (branch). In this way a prereconnaissance tool is inserted in the pipeline and removed again through the same hot tap. Such a prereconnaissance tool typically has a camera and surveying sensors and is used for discovering dirtying, deformations and blockages of the pipeline. The data supplied by the tool are preferably analyzed in real time, so that an evaluation of the pipeline state is possible.

Then in step S3 an interrogation or inquiry is made with respect to said data as to whether the pipeline is clean. If the interrogation in step S3 is affirmed (j), then in step S4 there is a following interrogation as to whether the geometry of the pipeline is in order or whether there is damage and deformation. If there is a negative reply in step S3 (n), in step S4 there is an interrogation to establish whether the contamination in the pipeline can be eliminated using conventional cleaning methods. These cleaning methods can e.g. involve the use of metal brushes or chemicals for pipeline cleaning.

If the interrogation in step S5 is affirmed, then the already explained interrogation in step S4 takes place. However, if there is a negative response in step S5, it is necessary in step S6 to work out jointly with the customer a specific cleaning program. Correspondingly in the case of a negative reply in step S4, it is necessary in step S7 to evolve a corresponding repair program for the pipeline geometry. Both in method step S6 and method step S7, in step S8 there is an interrogation as to whether the worked out program or programs can be performed in a cost-efficient manner. If this is the case, in a following method step S9 the corresponding special method or methods are performed. In the case of a negative response in step S8, in a following step S10 an attempt is made to draw up an alternative program. The possibilities are e.g. the creation of direct access to the pipeline (digging up, exposure; step 10') or the performance of hydrostatic tests, as is known to the expert (step S10").

In the case of a positive response in step S4 or following onto step S9, according to the invention a full size hot tap is fitted, i.e. with a cross-section substantially corresponding to the diameter D of pipeline 4 (cf. e.g. FIGS. 1, 6). For this purpose, in step S11 preferably a 45° hot tap bush is installed and a sealing means is fixed thereto. For other penetration angles the bush corresponds thereto. The pipeline is then drilled and the sealing means closed. Subsequently and as is e.g. shown in FIG. 1, the remaining inventive device 1 is connected to the sealing means, which are opened, the guide assembly being introduced into the pipeline and held in position therein. The tool is then injected into the pipeline from its transportation/storage container 1.4, as described hereinbefore.

The introduced tool 2 can be a cleaning pig (step S12), a caliper pig (step S13) or an injection pig (step S14), as shown in FIGS. 7a to 8b.

Thus, the invention permits cost-efficient working particularly oriented to the requirements of the customer with respect to unpiggable pipelines.

LIST OF REFERENCE NUMERALS

1 Device
1.1 Bush
1.1a Flange extension
1.2 Slide valve
1.3a, 1.3b Pipe part
1.4 Transportation/storage container
1.4a Pipe
1.4b Rotary flange
1.5 Load carrying device, flat-bed
1.6 First pipe part
1.6a Curved extension
1.6b Opening
1.7 Cylinder
1.8a, 1.8b Telescopic leg
1.9 Second pipe part
1.10 Holding device, ram
1.10a Ram body
1.11 Sealing body
1.12 Shoulder
2 Tool, pig
2.1, 2.1' Pulling unit
2.1a Wheel
2.2, 2.2' Magnetizing arrangement
2.3 Sensor support
2.4 Support arm
2.5 Sealing sleeve
2.6 Magnetizer 2.7 Sensor
2.8 Battery body
2.9 Roll
3a Ground
3b Ground surface
4 Pipeline
4a Pipeline wall
4.1, 4.2 Pipeline portion
4.1a, 4.2a Pipeline wall
4.1b, 4.2b Branch, hot tap
4.3 Valve
4.4 Drilled hole
5 Pipe valve arrangement
α Angle
A Dimension
B Joining area
C Introduction section
D Diameter
F Flow direction
$F_p$ Force
j Affirmed interrogation
K Edge
L Pipeline longitudinal axis
L' Longitudinal axis
n Negative interrogation
p Operating pressure
R Radius of curvature
S Axis of symmetry
S1-S14 Method step
T Tangent
U Circumferential direction
V Running direction
x Dimension

We claim:

1. A device for introducing a pig tool into an operating pipeline or a gas pipeline, the device comprising:
a guidance means which is at least partly introduced into a spot drilled hole of the pipeline, said guidance means having a substantially straight first pipe part having an introductory section disposed at an angle with respect to a longitudinal axis of the pipeline and with a curved, channel-like extension which, in an introduced state, sits on a wall of the pipeline facing the spot drilled hole, at least one portion of said first pipe part being located at a location outside of said pipeline, said at least one portion of said first pipe part comprising a first pipe part inner diameter, said first pipe part inner diameter being substantially equal to an inner diameter of the pipeline;
a pneumatically or hydraulically operated cylinder for injecting the tool into the pipeline, the tool comprising an outer tool diameter, said outer tool diameter being substantially equal to the inner diameter of the pipeline, the tool comprising support arms that are moveable in an inward direction and an outward direction; and
an interior bulge substantially diametrically facing said curved, channel-like extension and extending over a partial circumference of said substantially straight first pipe part, wherein the bulge functions to guide the tool around an edge of the spot drilled hole.

2. The device of claim 1, wherein an engagement area of said curved extension has a tangent which is substantially parallel to the longitudinal axis of the pipeline.

3. The device of claim 1, wherein said guidance means has a further, curved second pipe part with a path bent with respect to a running direction of said first pipe part and disposed on an end remote from said introductory section.

4. The device of claim 3, wherein said bent path is substantially 90°.

5. The device of claim 3, wherein said second pipe part is locally oriented in a plane substantially parallel to a running plane of the pipeline in an introduced state of said guidance means and at an end thereof remote from said first pipe part.

6. The device of claim 3, further comprising a closing means disposed in a joining area between said first and said second pipe parts.

7. The device of claim 6, wherein said closing means is constructed as a slider for pressure-proof closure of said guidance means.

8. The device of claim 5, further comprising a transportation/storage container for the tool connectable to said guidance means at an end thereof remote from said introductory section.

9. The device of claim 8, wherein the tool is injected into the pipeline through said guidance means from said transportation/storage container.

10. The device of claim 8, wherein said transportation/storage container is disposed on a load support device.

11. The device of claim 10, wherein said load support device is mobile or transportable.

12. The device of claim 10, wherein said load support device is constructed as a load carring device.

13. The device of claim 6, further comprising a holding device for holding said guidance means in position against an operating pressure in the pipeline.

14. The device of claim 13, wherein said holding device is constructed as a ram means acting from an outside on said guidance means.

15. The device of claim 13, wherein said holding device is constructed to act on said guidance means in a vicinity of a bend.

16. The device of claim 13, further comprising a bushing with flange extension fittable to the pipeline and into which said guidance means is introduced.

17. The device of claim 16, wherein said closing means and said holding device are jointly connectable to said flange extension.

18. The device of claim 1, wherein said angle is between 30° and 90°.

19. The device of claim 18, wherein said angle is approximately 45°.

20. A device for introducing a pig tool into an operating pipeline or a gas pipeline, the device comprising:
a pig tool structure comprising a plurality of support arms, said support arms being mounted for movement such that one or more of said support arms are movable in a radial inward direction and a radial outward direction with respect to at least a portion of a longitudinal axis of said pig tool structure;
a guidance means at least partially introduced into a spot drilled hole of the pipeline for guiding the pig tool structure into the pipeline, said guidance means comprising a pipe, said pipe comprising an introductory pipe section disposed at an angle relative to a longitudinal axis of the pipeline, said introductory pipeline section comprising a first introductory pipe portion and a second introductory pipe portion, said second introductory pipe portion comprising a curved portion, at least a portion of said curved portion being in contact with the surface of the pipeline, said surface facing in a direction of the spot drilled hole, said pipe having an inner pipe surface, said inner pipe surface defining an interior bulge for changing an orientation of the pig tool structure, said interior bulge extending at least in a circumferential direction of said introductory pipe section, said first introductory pipe portion defining a first pig tool traveling path upstream of said interior bulge, said second introductory pipe portion defining a second pig tool traveling path downstream of said interior bulge, said first pig tool traveling path extending in a first pig tool path direction, said second pig tool traveling path extending in a second pig tool path direction, said first pig tool path direction being different from said second pig tool path direction; and a pneumatically or hydraulically operated cylinder for injecting the pig tool structure into the pipeline.

21. A device in accordance with claim 20, wherein at least a portion of said bulge is located opposite a portion of the pipeline defining said spot drilled hole, the pipeline having a pipeline inner diameter, said pig tool structure comprising a pig tool structure outer diameter, said pig tool structure outer diameter being substantially equal to the pipeline inner diameter, said pipe comprising a pipe portion, said pipe portion being located at a position outside of the pipeline, said pipe portion comprising a pipe portion inner diameter, said pipe portion inner diameter being substantially equal to the pipeline inner diameter.

22. A device in accordance with claim 21, wherein said interior bulge substantially diametrically faces in a direction of said curved portion.

23. A device in accordance with claim 20, wherein an engagement area of said curved portion has a tangent which is substantially parallel to the longitudinal axis of the pipeline.

24. A device in accordance with claim 20, wherein said pipe comprises a first pipe part and a further, curved second pipe part with a path bent with respect to a running direction of said first pipe part and disposed on an end remote from said introductory section, said first pipe part comprising said introductory pipe section.

25. A device in accordance with claim 24, wherein said bent path is substantially 90°.

26. A device in accordance with claim 24, wherein said second pipe part is locally oriented in a plane substantially parallel to a running plane of the pipeline in an introduced state of said guidance means and at an end thereof remote from said first pipe part.

27. A device in accordance with claim 24, further comprising a closing means disposed in a joining area between said first and said second pipe parts.

28. A device in accordance with claim 27, wherein said closing means is constructed as a slider for pressure-proof closure of said guidance means.

29. A device in accordance with claim 26, further comprising a transportation/storage container for the pig tool structure connectable to said guidance means at an end thereof remote from said introductory section.

30. A device in accordance with claim 29, wherein the pig tool structure is injected into the pipeline through said guidance means from said transportation/storage container.

31. A device in accordance with claim 29, wherein said transportation/storage container is disposed on a load support device.

32. A device in accordance with claim 31, wherein said load support device is mobile or transportable.

33. A device in accordance with claim 31, wherein said load support device is constructed as a load carrying device.

34. A device in accordance with claim 27, further comprising a holding device for holding said guidance means in position against an operating pressure in the pipeline.

35. A device in accordance with claim 34, wherein said holding device comprises a ram means acting from an outside on said guidance means.

36. A device in accordance with claim 34, wherein said holding device acts on said guidance means in a vicinity of a bend.

37. A system for introducing a pig tool into an operating pipeline or a gas pipeline, the device comprising:
a pipeline comprising a pipeline inner diameter;
a tool structure comprising a tool structure outer diameter and a plurality of support arms, said plurality of support arms being mounted for movement such that said support arms are movable in an inward direction and an outward direction, said tool structure outer diameter being substantially equal to said pipeline inner diameter;
a guidance means at least partially introduced into a spot drilled hole of the pipeline for guiding the tool structure into the pipeline, said guidance means comprising a pipe, said pipe comprising an introductory pipe section and a pipe portion arranged at a location outside of said pipeline, said pipe portion comprising an inner pipe portion diameter, said inner pipe portion diameter being substantially equal to said pipeline inner diameter, said pipe being disposed at an angle relative to a longitudinal axis of the pipeline, said introductory pipe section comprising a curved portion, said curved portion comprising a curved outer surface portion, at least a portion of said curved outer surface portion defining an inner surface pipeline contact area for engaging an inner surface of the pipeline, the inner surface facing in a direction of the spot drilled hole, said introduction pipe section comprising an introductory outer surface portion, said introductory outer surface portion defining a pipe edge contact area for contacting at least a portion of the pipeline defining the spot drilled hole, said introductory pipe section having an inner introductory pipe section surface, said inner introductory pipe section surface defining an interior bulge at an end portion thereof for changing an orientation of the tool structure, said interior bulge being located opposite said pipe edge contact area, said interior bulge extending at least in a circumferential direction of said end portion of said introductory pipe section; and
a pneumatically or hydraulically operated cylinder for injecting the tool into the pipeline.

38. A system in accordance with claim 37, wherein said interior bulge substantially diametrically faces in a direction of said curved portion, said introductory pipe section comprising a first introductory pipe section and a second introductory pipe section, said second introductory pipe section comprising said curved portion, said first introductory pipe section defining a first tool traveling path upstream of said interior bulge, said second introductory pipe portion defining a second tool traveling path downstream of said interior bulge, said first tool traveling path extending in a first tool path direction, said second tool traveling path extending in a second tool path direction, said first tool path direction being different from said second tool path direction.

* * * * *